United States Patent [19]

Terwilliger et al.

[11] Patent Number: 4,476,467

[45] Date of Patent: Oct. 9, 1984

[54] RANDOM ENTRY INTERCOMPUTER NETWORK WITH COLLISION PREVENTION

[75] Inventors: Curtis G. Terwilliger, Burlingame; W. James McKeefery, Los Alto Hills; Szu C. Sun, Sunnyvale; Roger D. Melen, Mountain View, all of Calif.

[73] Assignee: Cromemco Inc., Calif.

[21] Appl. No.: 386,274

[22] Filed: Jun. 8, 1982

[51] Int. Cl.³ .............................................. H04Q 9/00
[52] U.S. Cl. .................................. 340/825.5; 370/85; 370/94; 455/58
[58] Field of Search ................. 340/825.5; 375/27, 55, 375/56, 84, 104; 370/94, 78, , 80, 85, 86; 455/58

[56] References Cited

U.S. PATENT DOCUMENTS

| | | | |
|---|---|---|---|
| 4,210,780 | 7/1980 | Hopkins et al. | 370/80 |
| 4,332,027 | 5/1982 | Malcolm et al. | 370/94 |
| 4,337,465 | 6/1982 | Spracklen et al. | 340/825.5 |
| 4,376,278 | 3/1983 | Jacobsthal | 340/825.5 |
| 4,384,363 | 5/1983 | Lipcon | 340/825.5 |
| 4,390,990 | 6/1983 | Ainsworth | 340/825.5 |

Primary Examiner—Donald J. Yusko
Attorney, Agent, or Firm—Paul Hentzel

[57] ABSTRACT

An arbitrary number of member computer stations are inter-connected by a "party" communication network. Each member station is normally in a high impedance Monitor Mode, for monitoring in-coming messages. The incoming messages latch the monitoring stations into a Receive Only Mode for preventing "interrupts" of on-going communications. Each station continuously monitors the input impedance from the network, to determine when the network is available for transmission. Member stations may enter the low impedance Transmit Mode only when the network is available, because all of the other stations are in the Monitor Mode. A high Z from the network indicates to each station that the network is available. A low Z indicates that another station is in the transmit Mode, and is in control of the network. The random entry of two (or more) parties at the same time is resolved by a Pre-Transmission Test Cycle. Full transmit status with actual data transmission, cannot be obtained unless the Test code transmission reveals a high network impedance indicating that the network is available. In the "two-party" start situation, each party senses the other parties low Transmit Mode impedance. Both parties drop back to the Monitor Mode, and a data "collision" is avoided.

31 Claims, 5 Drawing Figures

RANDOM ENTRY INTERCOMPUTER NETWORK WITH COLLISION PREVENTION

TECHNICAL FIELD

This invention relates to random entry, data transfer networks within a computer system having an arbitrary membership base, and more particularly to such networks in which data communication "collisions" between two or more transmitting members are avoided.

BACKGROUND

In today's paperless office, electronic messages are instantaneously distributed throughout the office computer system. Each message originates from the memory of a transmitting station and is received into the memory of one or more receiving stations. The basic "party" network permits only one station to send at a time, creating a potential for interruptions of an existing transmission, and the collision of two transmissions starting at the same time.

In the prior art "post-transmission" technique, each message is automatically resent to the source to be verified against the original message. Errors are not detected until the message has been transmitted twice. Erroneous messages must be resent and reverified until completed without interruption or collision. The costly re-transmission penalty limits the post-transmission approach to small, low volume communication systems.

Interruption prevention circuitry is required to latch the remaining, non-transmitting stations, into the receiving mode during in-coming transmissions. Communication collisions between two stations which simultaneously acquire transmission status is a less frequent (a special case of double transmission not covered by interrupt prevention). Simultaneous starts must be identified and aborted within an initial transmission test period. In addition, post collision priorities must be established to resolve the simultaneous start.

System wide controls in prior art networks provide for organized use of the party network, and double transmissions are avoided. Each subsequent user is identified in advance through user ques and transmission rosters. The system controls require more overhead time, additional software, and circuitry. Interrupts and collisions are avoided at the expense of speed and simplicity.

Prior art, single conductor coaxial cables have been dc coupled between member stations to indicate the receive-transmit status of the user stations. The coaxial shield was maintained at circuit ground, and therefore failed to isolate the stations from static discharge accumulating along the extensive party cable and from magnetic start-up surges associated with motors, flourescent lamps, and capacitive type power supplies.

SUMMARY

It is therefore an object of this invention to provide an improved data transfer network for a system of computers.

It is a further object of this invention to provide such a network which is less complex in design and more convenient for the user.

It is a further object of this invention to provide such a network which does not require a user que or a transmission rooster.

It is a further object of this invention to provide such a network which has an arbitrary membership base.

It is a further object of this invention to provide such a network which operates on a random entry to Transmit Mode from a normal Monitor Mode.

It is a further object of this invention to provide collision detection for such a network.

It is a further object of this invention to provide such a network in which any member stations may be disconnected and reconnected without affecting the remainder or the system.

It is a further object of this invention to provide such a network with no transmission priority.

It is a further object of this invention to provide such a network with "reset" transmission priority.

It is a further object of this invention to provide such a network with a "master" mode for override priority.

Briefly, these and other objects of the present invention are accomplished by providing a local interface circuit having a high impedance monitoring mode and a low impedance transmit mode. The circuit is connected to a local computer for interfacing with a plurality of similar remote monitor-transmit interface circuits and computers through an inter-computer data transfer system. The impedance into the data transfer system depends on the monitor-transmit status of the remote interface circuits change. A high impedance monitor in each local interface circuit monitors electrical signals from the data transfer system during the monitor mode. A low impedance transmission device in each local circuit provides transmission power to drive the data transfer system during the transmit mode. A collision detection circuit in each local circuit is responsive to the level of the transmission drive power required to send data out during the transmit mode. Changes in drive power indicate a corresponding change in the impedance of the data transfer system. When one or more remote stations are in the low impedance transmit mode, the local collision circuit terminates the transmit mode and resets the local interface circuit into the monitor mode.

BRIEF DESCRIPTION OF THE DRAWING

Further objects and advantages of the present random entry system, and the operation of the local interface circuit will become apparent from the following detailed description and drawing in which.

GENERAL DESCRIPTION (FIG. 1)

Figure 1:
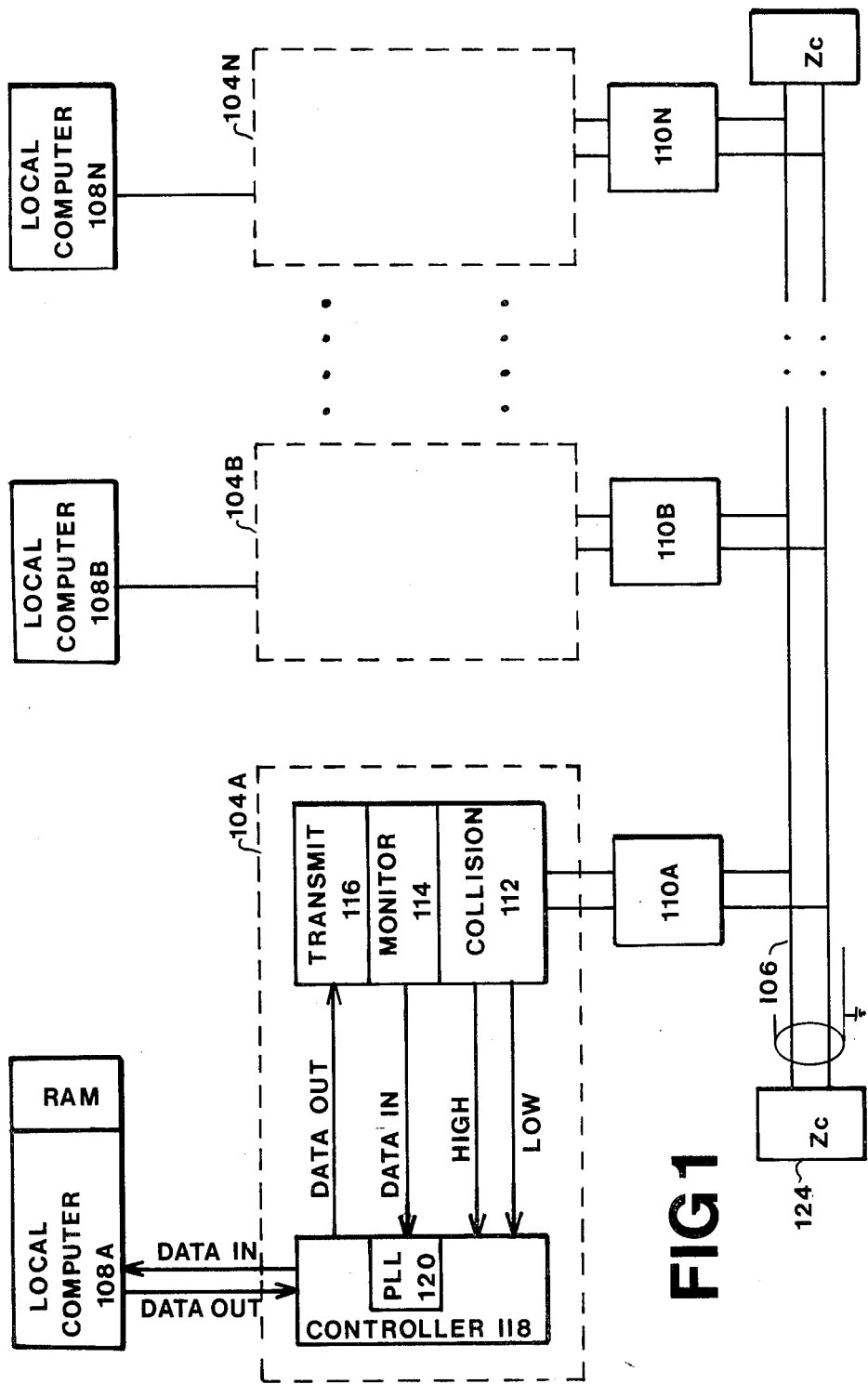
FIG. 1 is a block diagram of a computer system employing the random entry interface network.

Party data transfer system 100 is formed by an arbitrary number of member interface stations 104A, 104B,

... and 104N, connected by communication channel 106 through isolation devices 110A, 110B, ... and 110N. Each member station 104 serves an associated host computer 108A, 108B, ... and 108N by interfacing with channel 106. Communication channel 106 is a suitable cable such as a twisted wire pair within in a floating ground shield. Cable 106 is preferable terminated with its characteristic impedance (Zc) 124 at each end to minimize data signal reflections. The two termination Zcs are in parallel and form an effective channel impedance $Zc'$ equal to $Zc/2$.

Each station 104 has a collision detector stage 112, a monitor stage 114, a transmission stage 116, and a controller stage 118 for controlling the modes of the other stages and for processing data into and out of its host computer. If the computers are remote, a suitable inter-station synchronization device such as phase-locked loop 120 may be provided to coordinate the Data In rate with the local clock. Without a suitable sync device, small rate differences between the remote clocks and the local clock will cause a data "beat" in which an original data bit is lost, or a spurious data bit is created.

Each of the stations 104 is normally in the Monitor Mode and continuously monitors channel 106 for in-coming transmissions from the other stations. Monitor stage 114 provides the Data In signals to controller 118, causing controller 118 to retreat to the Receive Only Mode. During both the Monitor and the Receive Only Modes, station 104 has a very high internal impedance (thousands of ohms) which appears in parallel across channel 106 through isolation device 110. As a result, when one station is transmitting, and all of the stations in system 100 are in the Monitor Mode, the impedance from cable 106 into the transmitting station is slightly less than $Zc/2 = Zc'$. When the in-coming transmissions stop, the Receive Only Mode continues for a brief Post Receive Period to accommodate pauses in the in-coming transmission. The transmitting station then resets to the Monitor Mode.

The Transmit Mode is a very low impedance mode, having an internal impedance Zt in the same range of magnitude as $Zc'$. The Transmit Mode is initiated by a Pre-Transmission Test signal (or code) transmitted through transmitter stage 116. During the Test cycle, collision detector 112 responds to a circuit parameter within the transmitting circuitry to determine the impedance of the cable. The voltages, currents, and power level present during transmission accurately reflect the network impedance for indicating the Transmit-Monitor status of the remote stations. A high network impedance indicates that all of the stations are in the Monitor Mode, and that the network is available.

One suitable test parameter is the transmission current (It) required to drive the Test signal into cable 106. A normal drive It is due to $Zc'$, indicating that all of the other stations are in the Monitor Mode, and the transmission of Data Out can proceed. A HIGH (or LOW) test It indicates that another station is still in the low impedance Transmit Mode and is transmitting data in phase (or out of phase) with the Test signal. The testing station is reset to the Monitor Mode to avoid a data "collision". If both stations are simultaneously executing the Test cycle, they both reset to the Monitor Mode. Each station attempts another Test cycle, until priority is determined. Pre-Transmission Tests are forbidden during the Receive Only Mode to avoid data "interrupts".

HIGHER ORDER COLLISIONS (FIG. 2)

Higher order collisions involve more than two simultaneous transmission starts, and provide a geometrically increasing number of phase relationships between the transmitting stations. Each higher order situation (and phase combination therein) has a unique cable impedance, which may be distinguished from the normal one-party transmission impedance by the collision detectors.

Figure 2:
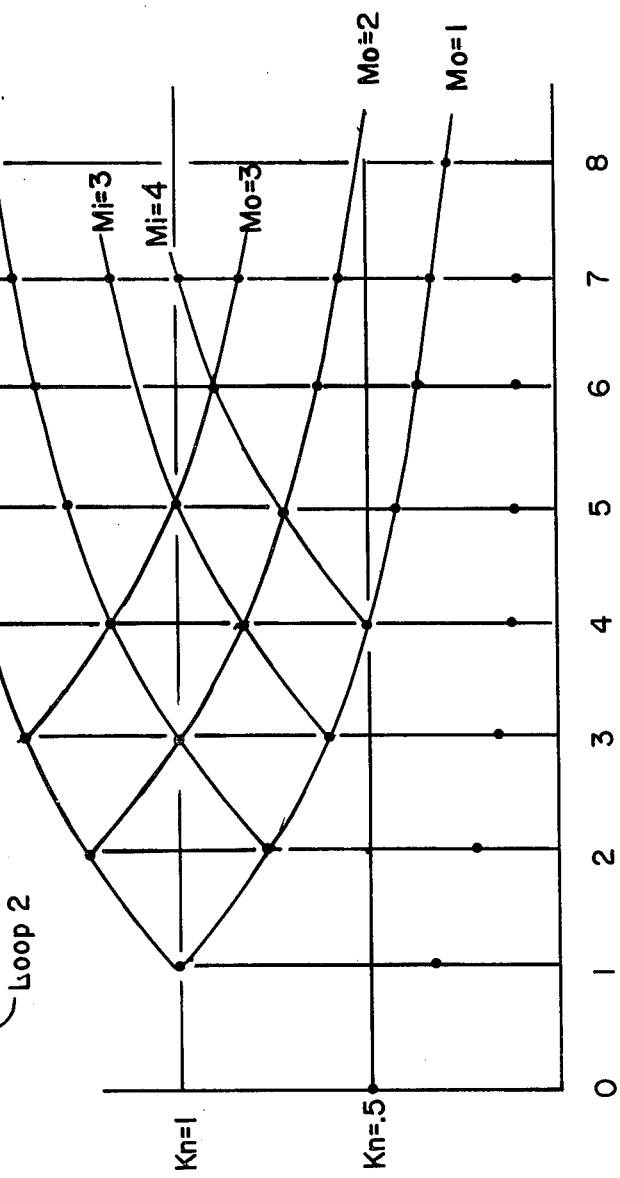
FIG. 2 is a diagram of the equivalent circuit of a network in as Nth order collision, showing the local parameters Vt, Zt, and It, and the network characteristic impedance Zc.

FIG. 2 shows the equivalent circuit diagram for the general case of an "Nth" Order collision involving "Mi" stations transmitting in phase and "Mo" stations transmitting out of phase (a total of N−1 or "Mt" stations). In the ideal case shown (no line loss between stations) the transmission circuit parameters of each of the transmitting stations are identical. Vt is the transmitter voltage at each station, It is the transmitter current of the Mi in phase stations, Io is the transmitter current of the Mo out of phase stations, Ic is the current through $Zc'$, and Zt is the internal impedance of the transmitter circuit. An indefinite number of non-transmitting stations have been lumped together as a single high impedance Zrem (shown in dashed lines). These stations are in the very high impedance Monitor Mode. The lumped Zrem is much greater than either $Zc'$ or Zt, and has been disregarded in this analysis.

The relationship between the local transmission parameters in each of the Nth Order collision situations is:

$$It = Kn(Vt/Zt);$$

where Kn is a conductance factor:

$$(Zt + 2MoZc')/(Zt + MtZc'),$$

which permits the different impedance situations to be easily compared.

The conductance factor is calculated from:

Node 1 equation: $MiIt = MoIo + IcZc,$

Loop 1 equation: $Vt = ItZt + IcZc',$ and

Loop 2 equation: $2Vt = ItZt + IoZt,$ by substitution.

Figure 3:
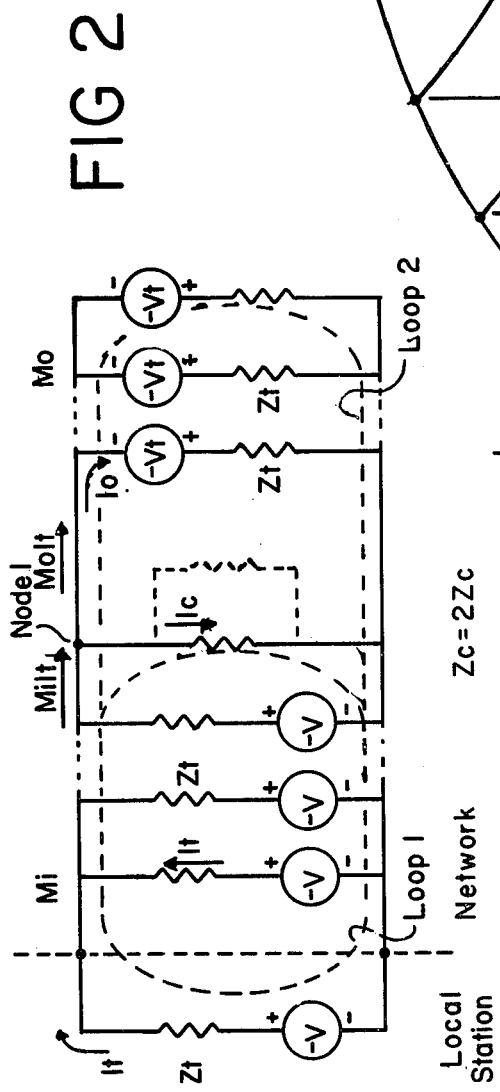
FIG. 3 is a chart of various network impedances (conductance factor Kn) for the special $Zt=Zc'$ case, plotted against the polarity combinations of higher order collisions showing the range of network impedances allowed in the Transmit Mode.

SPECIAL CASE $Zt = Zc'$ (FIG. 3)

The case of $Zt = Zc'$ is of special interest because of the impedance matching relationship between the local transmitter and the network cable.

$$Kn = (1 + 2mo)/(1 + Mt).$$

In the simplest case, one-party transmission, all of the remote stations are in the high Z Monitor Mode and are lumped into Zrem; and $$N = 0, Mt = 1, Mo = 0, KO = \tfrac{1}{2}, \text{ and}$$

$$It = Vt/2Zt.$$

The values of Kn for each of the higher order collisions are listed in the following table (N=0 to N=7) and graphically illustrated in FIG. 3 (N=0 to N=9).

| TABLE OF SPECIAL CASE Kn = 0 thru Kn = 7 | | | | | | | | |
|---|---|---|---|---|---|---|---|---|
| N = | -0- | -1- | -2- | -3- | -4- | -5- | -6- | -7- |
| Mo = 0 | 1/2 | 1/3 | 1/4 | 1/5 | 1/6 | 1/7 | 1/8 | 1/9 |
| | Mo = 1 | 3/3 | 3/4 | 3/5 | 3/6 | 3/7 | 3/8 | 3/9 |
| | | Mo = 2 | 5/4 | 5/5 | 5/6 | 5/7 | 5/8 | 5/9 |
| | | | Mo = 3 | 7/5 | 7/6 | 7/7 | 7/8 | 7/9 |
| | | | | Mo = 4 | 9/6 | 9/7 | 9/8 | 9/9 |
| | | | | | Mo = 5 | 11/7 | 11/8 | 11/9 |
| | | | | | | Mo = 6 | 13/8 | 13/9 |
| | | | | | | | Mo = 7 | 15/9 |

During a first level collision, both transmitting stations see either $Kn = \frac{1}{3}$ (Mo=1, out of phase) or a Kn=1 (Mo=0, in phase). Only two It levels are possible in a First Order collision, both of which are different from the normal It associated with $Kn = \frac{1}{2}$.

Figure 4:
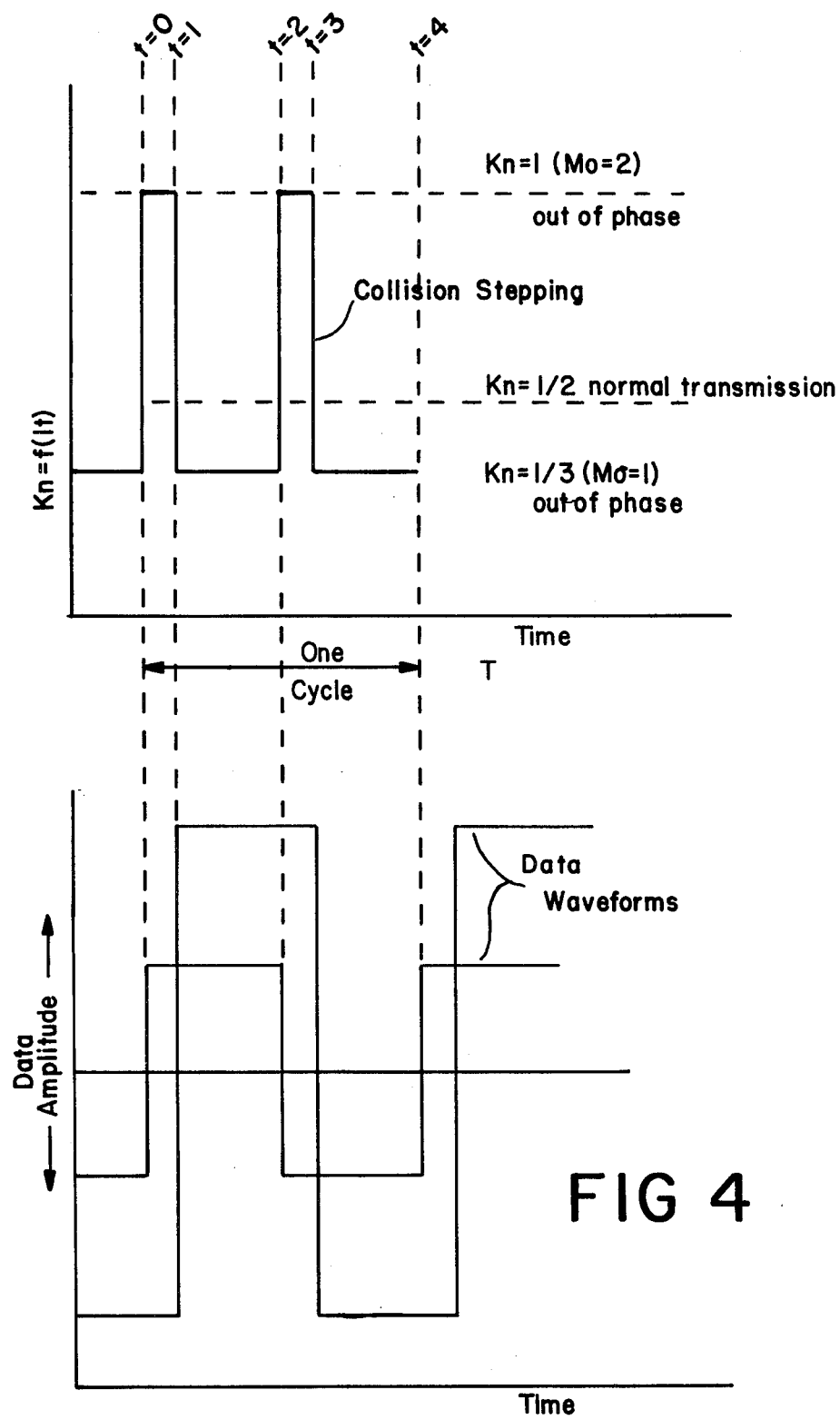
FIG. 4A is a waveform diagram of overlapping data signals in "collision", showing the step changes in network impedance caused by the changing phase relationship.

The level of It will step between the two values as the bits of transmitting data shift in and out of phase with each other. The overlapping phase relationship of two signals in collision is shown in FIG. 4. Each phase change generates a step change in the network impedance. In the simplest, N=1 case, the impedance steps four times within a single bit cycle (from t=0 to 5). The data signals in a higher order collision involving N+1 overlapping waveforms will step more times. In general the number of steps per data cycle will be two raised to the Nth power.

As can be seen in FIG. 3, the First, Second, and Third Order collisions have a total of nine conductance factors for the various phase relationships of the data signals. All of the factors are all removed from the normal transmission Kn of one-half. When any of these nine collisions should occur, the transmission current It deviates away from the normal It and steps between the impedance levels permitted by that order. The collision detector resets the station into the Monitor Mode.

A Fourth Order collision has five Kns. The Mo=1 level has a value of one-half, the same as the normal transmission Kn. The Eighth Order phase relationship of Mo=2 also has a value of one-half (and N=12 Mo=3, N=16 Mo=4, N=20 Mo=5 etc). In each of these repeating situations, the collision It is temporarily the same as the normal It. However, the collision immediately steps to a non-normal lever, permitting the collision detector to reset.

In a real network a slight line loss exists between the stations, which becomes significant for distant stations. The line reduces each It by a different amount, causing each Kn point in FIG. 3 to extend downwards a corresponding amount forming a band of levels. The omitted Zrem term representing the non-transmitting stations, reduces the vertical spread of the conductance factors and causes a general upward shift in the "in phase" curve (Mo=0).

COLLISION PROBABILITY

Higher order Test collisions between stations attempting to obtain the Transmit Mode do not happen often. Such collisions require the coincidence of many narrow Test windows within a much wider request time base. The probability "P1" of a first order collision is:

$P1$ = Test Window/Base Time Period.

The probability of a higher collision in general is:

$Pn$ = (Window/Base) to the nth power.

The narrow test Window is preferable long enough to allow for several complete Test bits. For a data rate of 500,000 bites per second, a 32 microsecond window permits a 16 bit Test cycle. The wider base Period is the average time between transmission requirements from the computers within the system, and depends on the use level.

Under ordinary "short message" use each machine within a system may require the Transmit Mode once every 10 seconds. In a ten computer system the request base time Period is one second. The probability of a First Order collision is:

$P1 = 32$ microseconds/one second $= 0.000,032$

One collision per 31,250 seconds (one per working day). The probability of a second Order collision is:

$P2 = 0.000,000,001,024$

One collision per 1,330 days (about one every 4 years).

In a larger system of 256 computers, each requiring the Transmit Mode every second on the average:

$P1 = 32$ microseconds/3906 microseconds $= 0.0082$, or about once every 122 second. Even in a large busy system the collision rate is small.

However, a single long message creates a bottleneck stations with a message to send. During a one second message (0.5 million bits), about one half of the 256 other stations will have developed a transmission requirement. At the termination of the long message, all of the waiting stations will attempt to obtain the Transmit Mode by transmitting a test cycle. Each 32 microsecond Test cycle will collide with the others, and resulting collision "chatter" will prevent any station from transmitting. A priority scheme may be employed to thin out the Test cycles and eliminate the chatter.

PRIORITY

Post collision priority may be handled by a Post Collision Restart Delay randomly generated by the control software. Each collision station draws a random delay period before resending the Pre-Transmission Test signal. The Test signal for each station may be a unique ID code, to insure that phase drift and resulting It level stepping is pronounced.

The random entry procedure handles all collision possibilities, without user ques, or transmission roosters, or related priority software. Priority is determined on a first-to-transmit basis. Each member station may be identical and interchangeable. The number of stations may be increased or decreased, and each station may be disconnected and reconnected, without affecting the other stations. The arbitrary membership, random entry system is entirely free from user management obligation.

A fixed post collision priority may be established by assigning a permanent Post Collision Delay Period to each controller 118. The controller with the shortest Delay Period has the highest priority, and will always be the first to retransmit Test signals, and obtain the Transmit Mode. Low priority stations are assigned Long Delay Periods, and lose the collision contest against the faster high priority stations. Alternatively, each message may be assigned a priority code which controls the Restart Delay in the event of the collision.

An Over-Ride control permits urgent messages to be transmitted without waiting for a random entry by causing the current transmitter to "abort" the less urgent message. The over-riding station enters the low impedance Transmit Mode, causing the over-ride Test signal to collide with the less urgent transmission on cable 106. The collision detector 112 at the transmitting station senses the increase in transmission drive power required to overcome lower cable impedance. The collision detector terminates the current transmission and resets the controller to the Monitor Mode.

CIRCUIT DIAGRAM (FIG. 5)

Figure 5:
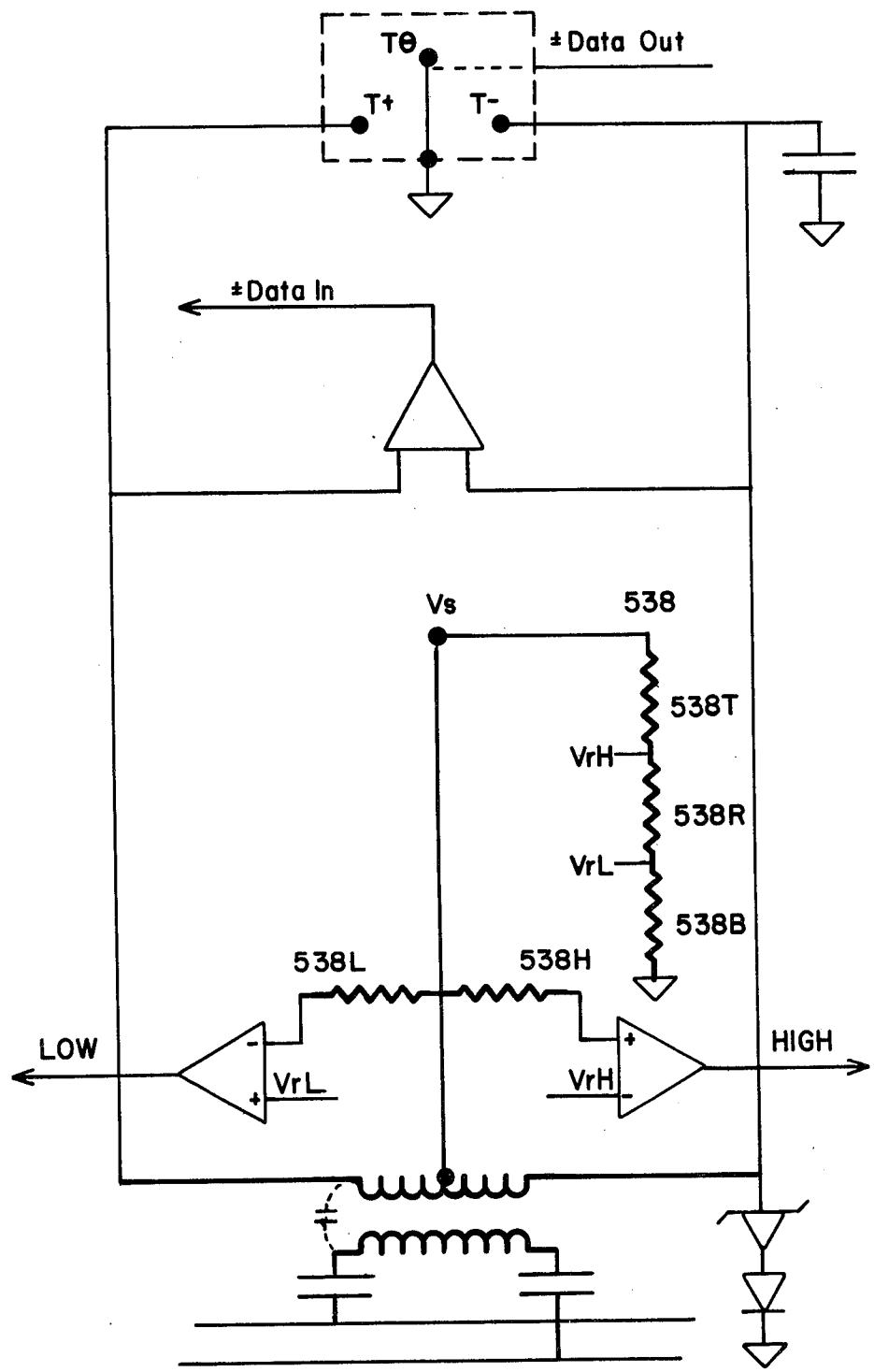
FIG. 5 is a schematic diagram of a center tapped embodiment of an interface circuit.

FIG. 5 shows a push-pull, center tap embodiment 500. The isolation device is a transformer 510 having a cable winding 510C connected across cable 506, and a center tapped station winding 510S connected to station 504. The monitor stage is a comparator 514 for sensing the presence and polarity of the received signals (+Data In and −Data In) induced across transformer 510. The transmission stage is logic switch 516 for applying station ground to either one of the two legs of station winding 510S. Switch 516 has a T+ position for +Data Out, a T− position for −Data Out, and a T0 position for the Monitor Mode.

The collision detector is formed by range comparators 530H and 530L connected to a suitable detection impedance such as load resistor 528D in series between the supply voltage Vs and the center tap. During the Transmit Mode, transmission output It flows from Vs through resistor chain 528 to energize the selected leg of station winding 510S. The signal input ViH and ViL to the comparators is provided at the center tap through current limiting networks 528H and 528L. The level of each Vi depends on It, and has a normal operating value VnH and VnL defined by It during non-collision transmissions.

High comparator 530H flips when the drive current is low and ViH exceeds VnH by a predetermined amount. High comparator 530H provides a HIGH signal to the station controller indicating that the Z from the cable is high.

Low comparator 530L flips when the drive current is high and ViL is less than VnL by a predetermined amount. Low comparator 530L provides a LOW signal to the station controller indicating that the Z from the cable is low.

The reference voltage VrH and VrL to comparators 530H and 530L, is provided by reference voltage divider 538 at points 538H and 538L. These reference voltages determine the HIGH and LOW threshold point of the comparators, and thus define the range of It permitted during Transmit Mode. the references voltages Vr are determined by the relative values of voltage dividing resistors 538T (top), 530B (bottom), and 538R (range). If desired, resistors 538 may be adjustable to provide for initial calibration of each member station 204, and to accommodate field conditions which affect the Z to the station. Resistor 538R controls the separation of VrH and VrL, and may be adjustable to increase or decrease the operating range of It.

The signal input voltage Vi is developed across load resistor 528D during Pre-Transmission Test to avoid collisions. Vi is also available during Transmit Mode to monitor It for detecting changes in Z from the cable and deactivating the transmitter circuit. Short circuits and low impedances across cable 506 require an increase It which flips High comparator 530H. Similarly, open circuits or high impedance in either wire of cable 506 reduce It, which flips Low comparator 530L. An Over-Ride transmission from another station reduces Z from the cable and terminates the local Transmit Mode.

SPECIFIC EMBODIMENT

The following particulars of are given as an illustrative example of a member station circuit, and to disclose available electronic parts for the circuits. The values and parts identified below are not intended as defining the limitations of the invention. Numerous other applications and configurations are possible.

Data Channel 504 may be a broad-band, twisted wire pair, with a grounded shield and a Zc of about 78 ohms. A low loss plastic jacket provided around the wires maintains a ⅛" wire spacing. The resulting distributed capacitance is very low. The roll off frequency is about 10 megaHz. Data may be transmitted through several miles of cable, in each direction without data loss.

Isolation transformer 510 may be a wide band pass, 2:1 step-up coupling transformer (T1-1811 core). A three section bobbin may be employed to reduced the primary to secondary coupling capacitance to less than 12 pff. Cable winding 510C has an inductance of about 6 mh, and is d.c. isolated from cable 506 by a pair of high-pass filter capacitors 540 (about 0.05 microfarads) connected in series on each side of winding 510C. Capacitors 240 minimizes the direct current flowing through winding 510C, and filters out 60 cycle not shunted by the cable shield. Station winding 510S is center tapped (6 mh per leg).

Supply voltage Vs is +5 volts dc, regulated to 5 percent. The normal drive current is about 66 ma.

Load Resistor 528D is a 39 ohm carbon resistor (2 percent tolerance, 1 watt power rating). Current limiting resistors 528H and 528L are 5.6K ohms.

Comparators 530H and 530L are M339s. The high comparator flips at an It of 20 percent below normal, and the low comparator flips at an It of 20 percent above normal. If desired, the comparators are active during the actual transmission of Data Out for sensing a Master Over-Ride situation in which a master station transmit a Test signal over the local transmission.

In reference voltage divider 538, resistor 538T is 1.78K ohms, resistor 538R is 1.21K ohms, and resistor 538B is 7.5K ohms.

Monitor 512 may be a comparator (LM311). The comparator inputs are connected across the outside legs of isolation transformer 510 through a pair of 10K ohm current limiting resistors. The high impedance of the Monitor Mode is the open circuit impedance of transformer 510 (about 5K ohms) and is principally due to inductive losses across cable winding 510C.

Transmitter stage 516 is a two position, open collector switch (74265) having a +T and a −T output to a four input buffer amplifier (75452). The input to the switch is responsive to the controller for determining the polarity of the transmissions. The Transmit Mode is controlled by a second signal from the controller applied to the other two inputs of the amplifier. The output of the amplifier is connected across the outside legs of the station winding 510S. Each leg is shunted to station ground by a transient spike suppressor diode circuit (zenor IN62759). A series isolation diode (IN4001) is provided to station ground to deal with the large static capacitance of the zenor. The low impedance of the Transmit Mode (about 38 ohms) is due to the action of transformer 510 combined with the low load resistor 528D.

INDUSTRIAL APPLICABILITY

It will be apparent to those skilled in the art that the objects of this invention have been achieved by providing an improved data transfer network for a system of computers. Each interface circuit is identical and may be interchanged. The arbitrary membership base allows for additional stations, or the merger of two systems. The random entry feature eliminates the need for user ques and organization software. Transmission priority may be employed using random reset delays.

CONCLUSION

Clearly various changes may be made in the structure and embodiments shown herein without departing from the concept of the invention. For example a half-bridge drive circuit could be employed with the transmitter switching between +Vs and −Vs (and 0 for monitoring). Further, the features of the embodiments shown in the various Figures may be employed with the embodiments of the other Figures.

Therefore, the scope of the invention is to be determined by the terminology of the following claims and the legal equivalents thereof.

We claim as our invention:

1. A local interface circuit having a high impedance monitoring mode and a low impedance transmit mode, and adapted to be connected between a local computer and a plurality of remote monitor-transmit interface circuits and computers through an inter-computer data transfer system which changes in impedance as the monitor-transmit status of the remote interface circuits change, the interface circuit comprising:
   high impedance monitoring means for monitoring electrical signals in the data transfer system during the monitor mode;
   low impedance transmission means for providing transmission power to drive the data transfer system during the transmit mode for transmission of data-out signals from the local computer; and
   a collision detection circuit responsive to the level of the transmission drive power required to transmit the data-out signals during the transmit mode for detecting changes in the impedance of the data transfer system and aborting the transmit mode and resetting the monitor mode.

2. The interface circuit of claim 1, wherein the collision detector circuit aborts the transmit mode and resets the monitor mode if the drive power deviates from within a range of drive powers.

3. The interface circuit of claim 2, wherein the collision detector circuit comprises:

detection impedance means connected in series with the transmission means and responsive to the drive power;
   a maximum comparator means responsive to the detection impedance means for determining if the transmission power is greater than a predetermined maximum; and
   a minimum comparator means responsive to the detection impedance means for determining if the transmission power is less than a predetermined minimum.

4. The interface circuit of claim 1, wherein the transmission means includes a switching means connected in series with the detection impedance for controlling the polarity of the data-out signals.

5. The interface circuit of claim 4, wherein the switching means has an off state for the monitor mode and a first conductive state for transmitting data-out signals of the first polarity and a second conductive state for transmitting the data-out signals of the second polarity.

6. The interface circuit of claim 5, wherein the transmission means further comprises:
   a first transmission circuit which is energized through the first conductive state of the switching means for providing transmissions of the first polarity; and
   a second transmission circuit which is energized through the second conducting state of the switching means for providing transmissions of the second polarity.

7. The interface circuit of claim 1, wherein the collision detection circuit continuously monitors the transmission power range, and over-rides the transmit mode if the drive power deviates outside the predetermined range.

8. The interface circuit of claim 1, wherein after each collision detection and reset to the monitor mode, the transmission means delays for a period of time prior to retransmitting.

9. The interface circuit of claim 1, wherein the transmission means transmits a pre-transmission test code prior to obtaining a data transmission mode.

10. An interface circuit having a high impedance monitoring mode and a low impedance transmit mode, and adapted to be connected between a host computer and a data transfer network formed be a plurality of similar monitor-transmit interface circuits and host computers therefor through a data transfer channel, which network step changes in impedance as the monitor-transmit status of the interface circuits change, the interface circuit comprising:
   coupling transformer means having a channel winding means adapted to be connected to the data transfer channel and having a circuit winding means connected to the interface circuit;
   monitoring means having a high internal impedance, and connected across at least a portion of the circuit winding means for monitoring the signal current flowing through the channel winding means;
   transmission means having a low internal impedance, and connected in series with the circuit winding means for controlling the flow of transmission current through the circuit winding to generate bits of data-out;
   collision detection circuit connected in series with the transmission means and the circuit winding means, and responsive to the transmission current level for terminating the transmission when the transmission current deviates from within a predetermined range due to step changes in the network impedance;

power source means for providing the transmission current.

11. The interface circuit of claim 10, further comprising a controller means for advancing the interface circuit from the monitor mode into the transmit mode, and responsive to the collision detection circuit for disabling the transmitter means and resetting monitor mode when the transmission current level deviates from within the predetermined range.

12. The interface circuit of claim 11, wherein the controller means has a receive only mode, and is responsive to the monitor means for establishing the receive only mode when signal current is flowing in the channel winding.

13. The interface circuit of claim 11, further comprising a phase locked loop for coordinating the data signal from the channel with the host computer.

14. The interface circuit of claim 10, wherein the circuit winding means is tapped forming a first winding portion between the tap point and a first leg and a second winding portion between the tap point and a second leg, with the first and second legs connected to the transmission means.

15. The interface circuit of claim 14, wherein the first winding portion is energized by the transmission means to transmit data bits having a positive polarity, and the second winding portion is energized by the transmission means to transmit data bits having a negative polarity.

16. The interface circuit of claim 15, wherein the transmission means comprises a switch connected to the first and second legs of the circuit winding portions for separately activating either leg thereof.

17. The interface circuit of claim 16, wherein the collision detector circuit is connected between the tap point and the power source means, and the transmission means switch connects local ground to the energized leg for generating the data out bits and for disabling the monitor means during transmission.

18. The interface circuit of claim 14, wherein the collision detector circuit comprises:
 detection impedance connected in series between the tap point and the power source means;
 a maximum comparator means responsive to the voltage across the detection impedance for determining if the transmission current is greater than a predetermined maximum; and
 a minimum comparator means responsive to the voltage across the detection impedance for determining if the transmission current is less than a predetermined minimum.

19. A random entry inter-computer data transfer system having an arbitrary membership base, adapted to be connected between a plurality of computers, comprising:
 data transfer cable means having a predetermined characteristic impedance;
 a plurality of member interface circuits adapted to be connected to the plurality of computers;
 a plurality of transformer means, each having a cable winding means connected in parallel across the cable means and each having a circuit winding means connected to one of the interface circuits, for coupling data-in from the cable means to the circuit and for coupling data-out from the circuit to the cable means;
 data receiving means within each interface circuit having a predetermined high impedance into the circuit winding means relative to the predetermined characteristic impedance, for monitoring the data signals from the cable means;
 data transmission means within each interface circuit having a predetermined low impedance into the circuit winding means relative to the predetermined high impedance means, for energizing the cable means during transmission of data-out signals;
 collision detection circuit within each interface circuit, connected in series with the transmission means and the circuit winding means for monitoring the energy level required to transmit signals into the cable means, in order to detect changes in impedance into the cable means;
 controller means responsive to the collision detection circuit for disabling the transmitter means when the transmission energy level deviates from within a predetermined range; and
 power source means for operating the interface circuit.

20. The interface circuit of claim 19, wherein the cable means is a twisted pair of conductive leads.

21. The interface circuit of claim 20, wherein the cable means further comprises an insulative jacket around the twisted pair for maintaining the conductors in a spaced relationship.

22. The interface circuit of claim 20, wherein the cable means further comprises a conductive shield member around the twisted pair.

23. The interface circuit of claim 22, wherein the conductive shield member is floating.

24. The interface circuit of claim 19, wherein the cable winding means is a single cable winding, and the circuit winding means is tapped to form a first and a second circuit winding.

25. The interface circuit of claim 19, wherein the collision detector circuit comprises:
 detection impedance connected in series between the transmission means and the power source means for developing a voltage dependent on the drive energy during transmission;
 a maximum comparator means responsive to the voltage across at least a portion of the detection impedance for determining if the transmission current is greater than a predetermined maximum; and
 a minimum comparator means responsive to the voltage across at least a portion of the detection impedance for determining if the transmission energy is less than a predetermined minimum.

26. The interface circuit of claim 25, wherein the detection impedance is about equal to one half of the characteristic impedance of the cable means.

27. The interface circuit of claim 26, wherein the detection impedance is about 38 ohms.

28. The interface circuit of claim 19, wherein the predetermined energy range includes the energy level required for a station to transmit into the rest of the system when no other station is transmitting, and does not include the higher and lower energy levels required for a station to transmit into the rest of the system when at least one additional station within the system is transmitting.

29. The interface circuit of claim 28, wherein the controller enables the receiving means when each data-out transmission is finished.

30. The interface circuit of claim 28, wherein the transmission means transmits a test cycle prior to transmitting data in order to check the energy level and determine if another station is transmitting.

31. The interface circuit of claim 29, wherein the test cycle is a unique ID code for each interface circuit.

* * * * *